(12) United States Patent
Hegde et al.

(10) Patent No.: US 7,818,321 B2
(45) Date of Patent: Oct. 19, 2010

(54) METHOD AND SYSTEM FOR GENERATING AND PROVIDING RICH MEDIA PRESENTATIONS OPTIMIZED FOR A DEVICE OVER A NETWORK

(76) Inventors: Kiran Venkatesh Hegde, 15618 NE. 106th Ct., Redmond, WA (US) 98052; Raymond Edward McGrath, III, 3102 - 92nd Ave., NE., Bellevue, WA (US) 98004; Jason Matthew Walter Kind, 8519 NE. 176th St., Bothell, WA (US) 98011; Eric Kane Krause, 17520 167th Ave. NE., Woodinville, WA (US) 98072; Josiah DeWitt, 408 Monroe Ave. NE., Suite 305, Renton, WA (US) 98056-8451

( * ) Notice: Subject to any disclaimer, the term of this patent is extended or adjusted under 35 U.S.C. 154(b) by 139 days.

(21) Appl. No.: 11/603,381

(22) Filed: Nov. 21, 2006

(65) Prior Publication Data

US 2007/0067315 A1   Mar. 22, 2007

Related U.S. Application Data

(63) Continuation of application No. 10/046,135, filed on Jan. 11, 2002, now Pat. No. 7,155,436.

(60) Provisional application No. 60/261,712, filed on Jan. 12, 2001.

(51) Int. Cl.
*G06F 7/00* (2006.01)

(52) U.S. Cl. .................. 707/736; 709/219; 709/232; 725/2; 725/86; 707/770

(58) Field of Classification Search .............. 707/1, 707/10, 100–102, 104.1, 736, 770; 715/723, 715/501.1, 753; 725/2, 86; 709/219, 231, 709/232; 705/736
See application file for complete search history.

(56) References Cited

U.S. PATENT DOCUMENTS

| | | | | |
|---|---|---|---|---|
| 5,666,554 A | * | 9/1997 | Tanaka | 715/203 |
| 5,727,157 A | * | 3/1998 | Orr et al. | 709/224 |
| 5,764,241 A | * | 6/1998 | Elliott et al. | 345/473 |
| 5,818,436 A | | 10/1998 | Imai et al. | 715/500.1 |
| 5,852,800 A | * | 12/1998 | Modeste et al. | 704/270.1 |
| 5,892,915 A | | 4/1999 | Duso et al. | 709/219 |

(Continued)

OTHER PUBLICATIONS

"Supporting interactive presentation for distributed multimedia applications"—Bates et al.—Multimedia tools and applications Journal, vol. 1, No. 1—Mar. 1995—(pp. 47-78).*

(Continued)

*Primary Examiner*—Jean B. Fleurantin
*Assistant Examiner*—Anh Ly

(57) ABSTRACT

The present invention provides rich media presentations to a requesting device when required. Attributes of the requesting device are determined and used to create optimized code for the requesting device. The attributes may include information relating to the operating system of the requesting device; a media player; a bandwidth parameter; presence or absence of a firewall, permissions related to the requesting device, and the like. A virtual player is created that includes code to play media files. A presentation package is created that sets the presentation attributes for the multimedia experience. A media package is created that instructs the virtual player what multimedia content to play.

17 Claims, 14 Drawing Sheets

U.S. PATENT DOCUMENTS

| | | | |
|---|---|---|---|
| 5,943,046 A | 8/1999 | Cave et al. | 715/716 |
| 5,996,015 A * | 11/1999 | Day et al. | 709/226 |
| 6,003,041 A * | 12/1999 | Wugofski | 707/104.1 |
| 6,046,750 A * | 4/2000 | Fitzpatrick et al. | 345/440 |
| 6,049,828 A * | 4/2000 | Dev et al. | 709/224 |
| 6,248,649 B1 | 6/2001 | Henley et al. | 438/515 |
| 6,248,946 B1 | 6/2001 | Dwek | |
| 6,262,724 B1 * | 7/2001 | Crow et al. | 715/723 |
| 6,356,921 B1 * | 3/2002 | Kumar et al. | 715/203 |
| 6,421,692 B1 * | 7/2002 | Milne et al. | 715/202 |
| 6,446,080 B1 | 9/2002 | Van Ryzin et al. | 707/104.1 |
| 6,446,130 B1 | 9/2002 | Grapes | 709/231 |
| 6,448,980 B1 * | 9/2002 | Kumar et al. | 715/745 |
| 6,496,981 B1 | 12/2002 | Wistendahl et al. | |
| 6,535,888 B1 | 3/2003 | Vijayan et al. | 707/104.1 |
| 6,546,558 B1 * | 4/2003 | Taguchi | 725/135 |
| 6,553,413 B1 | 4/2003 | Leighton et al. | |
| 6,567,918 B1 * | 5/2003 | Flynn et al. | 726/7 |
| 6,598,075 B1 | 7/2003 | Ogdon et al. | 709/204 |
| 6,601,009 B2 | 7/2003 | Florschuetz | 702/124 |
| RE38,284 E * | 10/2003 | Allen et al. | 715/273 |
| 6,637,031 B1 | 10/2003 | Chou | 725/87 |
| 6,745,368 B1 | 6/2004 | Boucher et al. | 715/500.1 |
| 6,834,308 B1 | 12/2004 | Ikezoye et al. | 709/231 |
| 6,948,131 B1 * | 9/2005 | Neven et al. | 715/753 |
| 6,985,934 B1 * | 1/2006 | Armstrong et al. | 709/219 |
| 7,010,580 B1 | 3/2006 | Fu et al. | |
| 7,133,837 B1 | 11/2006 | Barnes, Jr. | |
| 7,178,161 B1 * | 2/2007 | Fristoe et al. | 725/86 |
| 7,233,948 B1 * | 6/2007 | Shamoon et al. | 707/9 |
| 7,240,100 B1 * | 7/2007 | Wein et al. | 709/214 |
| 7,299,291 B1 * | 11/2007 | Shaw | 709/231 |
| 7,308,487 B1 * | 12/2007 | Dansie et al. | 709/219 |
| 7,386,784 B2 * | 6/2008 | Capps et al. | 715/203 |
| 7,469,283 B2 * | 12/2008 | Eyal et al. | 709/223 |
| 2001/0029523 A1 | 10/2001 | Mcternan et al. | 709/205 |
| 2001/0047348 A1 | 11/2001 | Davis | 707/1 |
| 2001/0047422 A1 * | 11/2001 | McTernan et al. | 709/231 |
| 2002/0019831 A1 * | 2/2002 | Wade | 707/500 |
| 2002/0069217 A1 * | 6/2002 | Chen et al. | 707/500.1 |
| 2002/0082730 A1 * | 6/2002 | Capps et al. | 700/94 |
| 2002/0083138 A1 | 6/2002 | Wilson et al. | 709/206 |
| 2002/0107940 A1 * | 8/2002 | Brassil | 709/219 |
| 2002/0124100 A1 * | 9/2002 | Adams | 709/232 |
| 2002/0129052 A1 * | 9/2002 | Glazer et al. | 707/501.1 |
| 2002/0129089 A1 | 9/2002 | Hegde et al. | 709/200 |
| 2002/0169797 A1 | 11/2002 | Hegde et al. | |
| 2002/0198953 A1 * | 12/2002 | O'Rourke et al. | 709/213 |
| 2003/0018966 A1 * | 1/2003 | Cook et al. | 725/2 |
| 2003/0187811 A1 * | 10/2003 | Chang et al. | 707/1 |
| 2003/0191816 A1 * | 10/2003 | Landress et al. | 709/219 |
| 2004/0006592 A1 * | 1/2004 | Chang et al. | 709/203 |
| 2004/0090466 A1 * | 5/2004 | Loveria, III | 345/781 |
| 2005/0010596 A1 * | 1/2005 | Yoneyama | 707/104.1 |
| 2005/0044189 A1 * | 2/2005 | Ikezoye et al. | 709/219 |
| 2005/0081159 A1 | 4/2005 | Gupta et al. | 715/751 |
| 2005/0165842 A1 * | 7/2005 | Nishimura et al. | 707/104.1 |
| 2005/0165843 A1 * | 7/2005 | Capps et al. | 707/104.1 |
| 2005/0166136 A1 * | 7/2005 | Capps et al. | 715/500.1 |
| 2005/0256941 A1 * | 11/2005 | Armstrong et al. | 709/219 |
| 2006/0015904 A1 * | 1/2006 | Marcus | 725/46 |
| 2006/0026665 A1 * | 2/2006 | Rodriguez et al. | 725/135 |
| 2006/0064645 A1 * | 3/2006 | Neven et al. | 715/753 |
| 2007/0061845 A1 * | 3/2007 | Barnes, Jr. | 725/62 |
| 2007/0234196 A1 * | 10/2007 | Nicol et al. | 715/501.1 |
| 2007/0288588 A1 * | 12/2007 | Wein et al. | 709/214 |
| 2008/0134342 A1 * | 6/2008 | Shamoon et al. | 726/27 |
| 2008/0222243 A1 * | 9/2008 | Shaw | 709/203 |
| 2010/0100636 A1 | 4/2010 | Hegde | |

OTHER PUBLICATIONS

"The HotMedia Architecture: Progressive and Interactive Rich Media for the Internet"—Kumar et al.—Internet Media Group, IBM Corp.—Multimedia, IEEE Treansaction on, Jun. 2001—vol. 3, Issue 2, (pp. 253-267).*

"Distributed cognition: toward a new foundation for human-computer Interaction research"—Hollan et al.—ACM transactions on computer-human interaction (TOCHI), Jun. 2000, vol. 7, issue 2, (pp. 174-196).*

"Final Office Action", U.S. Appl. No. 10/084,258, (Mar. 31, 2009), 26 pages.

"Non Final Office Action", U.S. Appl. No. 10/084,258, (Sep. 4, 2009), 10 pages.

"Non Final Office Action", U.S. Appl. No. 10/084,258, (May 5, 2010), 10 pages.

"Final Office Action", U.S. Appl. No. 10/084,258, (Mar. 2, 2010), 10 pages.

* cited by examiner

METHOD AND SYSTEM FOR GENERATING AND PROVIDING RICH MEDIA PRESENTATIONS OPTIMIZED FOR A DEVICE OVER A NETWORK

RELATED APPLICATION

This application claims the benefit of U.S. Provisional Application No. 60/261,712, filed Jan. 12, 2001, the benefit of the earlier filing date of which is hereby claimed under 35 U.S.C. § 119 (e).

This utility patent application is a continuation of and claims the benefit under 35 United States Code §120 of U.S. patent application Ser. No. 10/046,135 entitled "Method and System For Generating and Providing Rich Media Presentations Optimized For A Device Over A Network" filed on Jan. 11, 2002 now U.S. Pat. No. 7,155,436, the disclosures of which are expressly incorporated by reference.

FIELD OF THE INVENTION

The present invention relates to providing content over a network, and more specifically to providing rich media presentations to a device over a network.

BACKGROUND OF THE INVENTION

The Internet has seen expansive growth over the last several years. Not only are there more Web sites providing a wide range of information, service, and goods, there are more users on the Internet than ever before.

Today, users may experience multimedia clips, purchase goods, access the world's news as it happens, obtain reviews on various items or products in a variety of formats, or access a variety of resources all on the Internet. For example, a user may read product reviews, view pictures of a product, or in some instances, watch a video presentation related to the product.

In order to access the available resources, however, Internet users are exposed to a variety of different media types while visiting a Web site. Not only may users access textual information, they may also view graphical images, or watch multimedia presentations, including audio and video, that may be streamed or downloaded. The steps required to access this media, however, may be overwhelming to many of the users. Not only do certain sites require users to use particular products to access the media, many sites require the user to know the configuration of their system in order to play certain media files. For example, a user may have to download a particular media player, upgrade to a different version, or know the particular programs they are using on their system. With so many available options to access and play media files, users are constantly bombarded with different requirements.

Another requirement to view many multimedia sites is a high bandwidth connection to the Internet. Many sites rely on the user having a high bandwidth when streaming media to the user. While the majority of businesses today have access to broadband, the majority of home users connect to the Internet through a low speed dial-up modem resulting in a poor multimedia experience.

SUMMARY OF THE INVENTION

The present invention is directed at providing a method and system for providing rich media presentations to a network device.

According to one aspect of the invention, virtual player packages are delivered to a device over a network. The virtual player packages are delivered to the requesting device in an optimized manner.

According to another aspect of the invention, attributes of the device are determined. The attributes may include information relating to the operating system of the device; a preferred media player; a bandwidth parameter; presence or absence of a firewall, permissions related to the requesting device, and the like.

According to yet another aspect of the invention, rich media presentations, including a virtual player, presentation packages, and media packages, are provided to the requesting device. The creation of the rich media presentations is partly based on the determined attributes and is directed at being optimized for the requesting device.

According to still yet another aspect of the invention, the rich media presentations may be delivered to the device before a request is made by the device to play the presentation.

According to still yet another aspect of the invention, the rich media presentations are retrieved from a location on the network that is directed at providing optimized throughput to the requesting device. When the rich media presentations are cached at the location on the network, the rich media presentations are delivered to the device. Otherwise, the appropriate rich media presentations are created for the device, and the rich media presentations are cached for future delivery. Alternatively, the rich media presentations may be generated in real-time and delivered.

DETAILED DESCRIPTION OF THE PREFERRED EMBODIMENT

Figure 1:
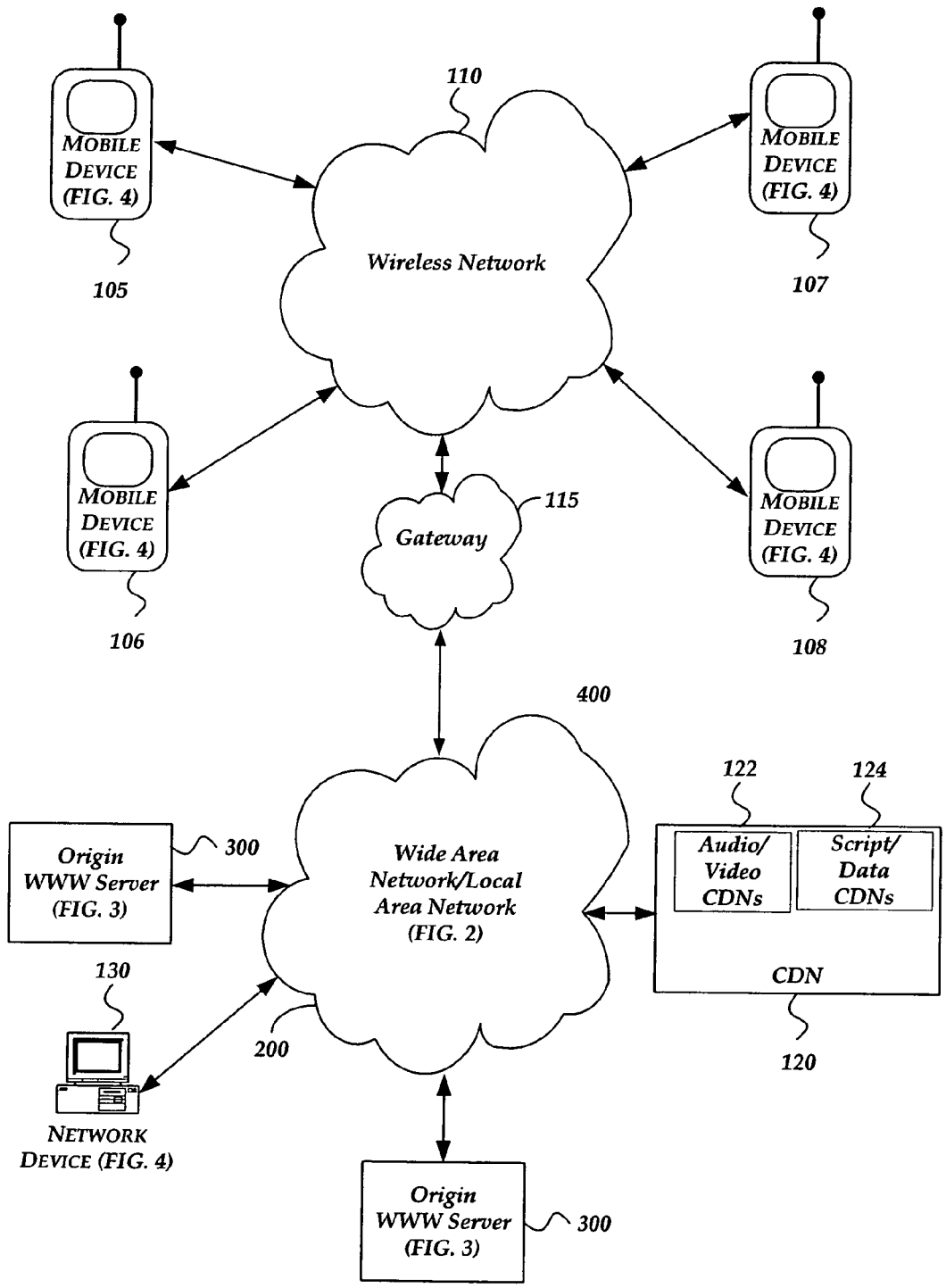
FIG. 1 illustrates a schematic diagram of an exemplary network overview, in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "rich media presentation" includes a virtual player, presentation package, and media package. The term "virtual player" means a set of proxy codes that are implemented at runtime with code optimized specifically to the device in question to play media content. The term "presentation package" means attributes that offer a way to dynamically and remotely control user experience for wide-ranging streaming media playback devices that correspond to display and presentation of media. The term "media package" means a way to dynamically and remotely control varying types of media content to a wide range of network media playback devices without having to deal with the specifics of each device nor the streaming server network protocols. The term "provider" means the party that provides the rich media presentations to a device. The term "e-retailer" means a party that has an affiliation with the provider. Referring to the drawings, like numbers indicate like parts throughout the views. Additionally, a reference to the singular includes a reference to the plural unless otherwise stated or is inconsistent with the disclosure herein.

Illustrative Operating Environment

With reference to FIG. 1, an exemplary system in which the invention operates includes wireless mobile devices 105-108, wireless network 110, gateway 115, one or more content delivery networks (CDN) 120, wide area network (WAN)/local area network (LAN) 200, one or more network devices 130, and one or more world wide web (WWW) origin servers 300.

Figure 4:
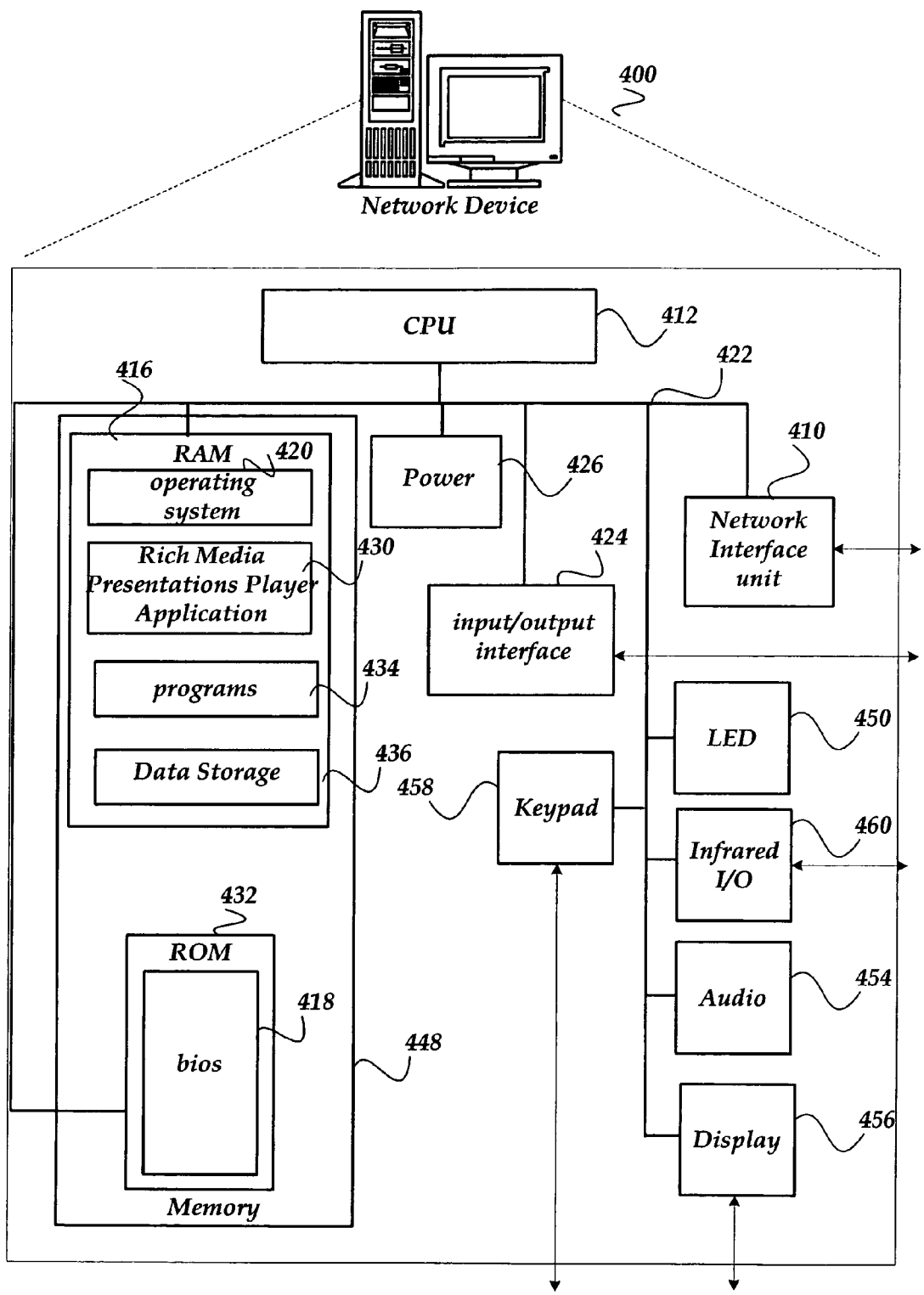
FIG. 4 shows a schematic diagram of an exemplary network device.

Wireless devices 105-108, are coupled to wireless network 110 and are described in more detail in conjunction with FIG. 4. Generally, mobile devices 105-108 include any device capable of connecting to a wireless network such as wireless network 110. Such devices include cellular telephones, smart phones, pagers, radio frequency (RF) devices, infrared (IR) devices, citizen band radios (CBs), integrated devices combining one or more of the preceding devices, and the like. Mobile devices 105-108 may also include other devices that have a wireless interface such as PDAs, handheld computers, personal computers, multiprocessor systems, microprocessor-based or programmable consumer electronics, network PCs, wearable computers, and the like.

Wireless network 110 transports information to and from devices capable of wireless communication, such as mobile devices 105-108. Wireless network 110 may include both wireless and wired components. For example, wireless network 110 may include a cellular tower linked to a wired telephone network. Typically, the cellular tower carries communication to and from cell phones, pagers, and other wireless devices, and the wired telephone network carries communication to regular phones, long-distance communication links, and the like.

Wireless network 110 is coupled to WAN/LAN through gateway 115. Gateway 115 routes information between wireless network 110 and WAN/LAN 200. For example, a user using a wireless device may browse the Internet by calling a certain number or tuning to a particular frequency. Upon receipt of the number, wireless network 110 is configured to pass information between the wireless device and gateway 115. Gateway 115 may translate requests for web pages from wireless devices to hypertext transfer protocol (HTTP) messages, which may then be sent to WAN/LAN 200. Gateway 115 may then translate responses to such messages into a form compatible with the requesting device. Gateway 115 may also transform other messages sent from wireless devices 105-108 into information suitable for WAN/LAN 200, such as e-mail, audio, voice communication, contact databases, calendars, appointments, and the like.

Figure 2:
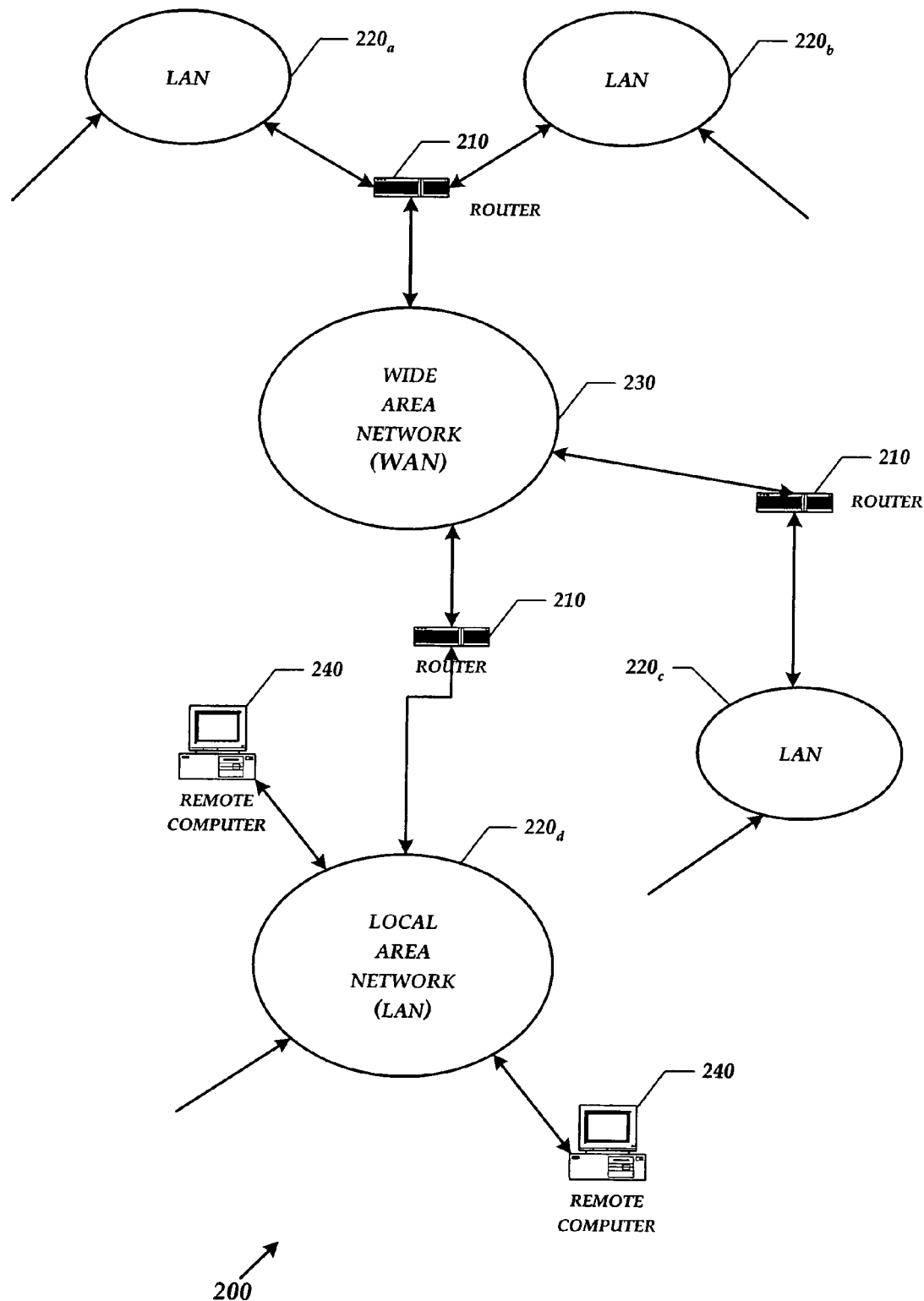
FIG. 2 shows a schematic diagram illustrating an exemplary system overview in which local area networks and a wide area network are interconnected by routers.

Typically, WAN/LAN 200 transmits information between computing devices as described in more detail in conjunction with FIG. 2. One example of a WAN is the Internet, which connects millions of computers over a host of gateways, routers, switches, hubs, and the like. An example of a LAN is a network used to connect computers in a single office. A WAN may connect multiple LANs.

Content delivery network (CDN) 120 is coupled to WAN/LAN 200 through communication mediums. CDN 120 may include many types of CDNs. For example, CDN 120 may include audio/video CDNs 122 designed to optimally deliver audio and video or script/data CDNs 124 designed to optimally deliver script or data to the requesting device. CDNs use various techniques to improve the performance of content delivery for Web sites. They may increase reliability of a web site by providing mirrored content across distributed servers and provide increased bandwidth as compared to a single server. CDNs may also employ various caching techniques to increase the end user's performance. Content may be pushed to the edges of the network to minimize delay associated with retrieving the content. Load balancing may also be used to help route a user's request for content to the best available content source. Typically, a web site subscribes to a CDN and instructs the CDN how to deliver its content. The subscribing web site may serve some content on its own avoiding the CDN and use the CDN to serve other content. While CDNs are typically used for WAN/LAN applications, the technology may be applied to intranets and extranets as well.

WWW origin servers 300 are coupled to WAN/LAN 200 through communication mediums. WWW origin servers 300 provide access to information and services as described in more detail in conjunction with FIG. 3.

Network device 130 is coupled to WAN/LAN 200 and is described in more detail in conjunction with FIG. 4. Generally, network device 130 includes any device capable of connecting to a data network, and includes the functionality to play media included in a media playlist.

FIG. 2 shows another exemplary system in which the invention operates in which a number of local area networks ("LANs") $220_{a\text{-}d}$ and wide area network ("WAN") 230 interconnected by routers 210. Routers 210 are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 240, and other related electronic devices can be remotely connected to either LANs $220_{a-d}$ or WAN 230 via a modem and temporary telephone link. The number of WANs, LANs, and routers in FIG. 2 may be increased or decreased without departing from the spirit or scope of this invention. As such, it will be appreciated that the Internet itself may be formed from a vast number of such interconnected networks, computers, and routers and that an embodiment of the invention could be practiced over the Internet without departing from the spirit and scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

Figure 3:
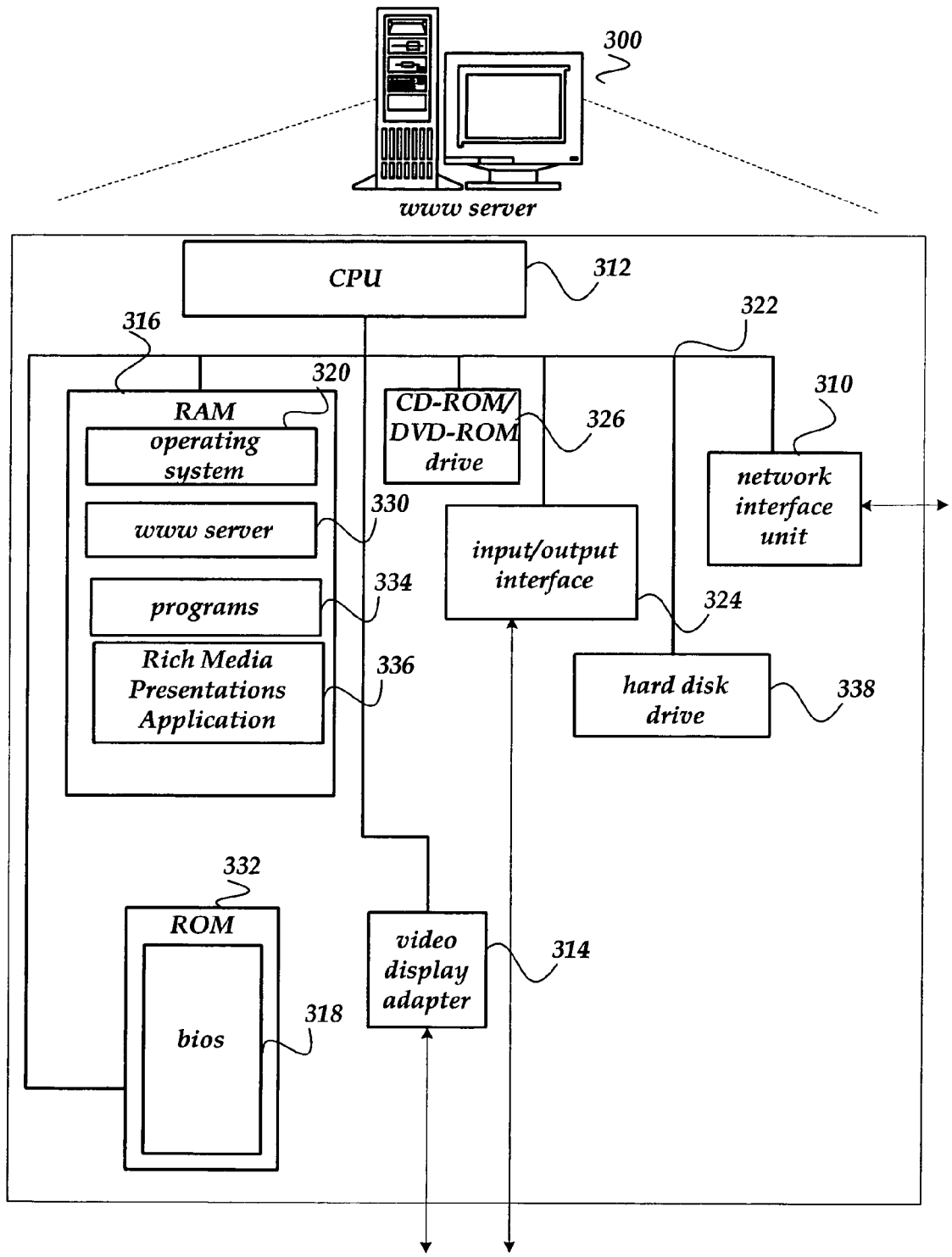
FIG. 3 illustrates a schematic diagram of an exemplary server.

A WWW origin server, as described in more detail in conjunction with FIG. 3, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 3 shows an exemplary WWW origin server 300 that is operative to provide a WWW site. Accordingly, WWW origin server 300 transmits WWW pages to the WWW browser application program executing on requesting devices to carry out this process. For instance, WWW origin server 300 may transmit pages and forms for receiving information about a user, such as user preferences, address, telephone number, billing information, credit card numbers, and the like. Moreover, WWW origin server 300 may transmit WWW pages to a requesting device that allow a user to participate in a WWW site. The transactions may take place over the Internet, WAN/LAN 200, or some other communications network known to those skilled in the art.

WWW origin server 300 may include many more components than those shown in FIG. 3. However, the components shown are sufficient to disclose an illustrative embodiment for practicing the present invention. As shown in FIG. 3, WWW origin server 300 is connected to WAN/LAN 200, or other communications network, via network interface unit 310. Network interface unit 310 includes the necessary circuitry for connecting WWW origin server 300 to WAN/LAN 200, and is constructed for use with various communication protocols including the TCP/IP protocol. Typically, network interface unit 310 is a card contained within WWW origin server 300.

WWW origin server 300 also includes processing unit 312, video display adapter 314, and a mass memory, all connected via bus 322. The mass memory generally includes RAM 316, ROM 332, and one or more permanent mass storage devices, such as hard disk drive 328, a tape drive, CD-ROM/DVD-ROM drive 326, and/or a floppy disk drive. The mass memory stores operating system 320 for controlling the operation of WWW origin server 300. This component may comprise a general purpose server operating system, such as UNIX, LINUX™, Microsoft WINDOWS NT®, and the like. Basic input/output system ("BIOS") 318 is also provided for controlling the low-level operation of WWW origin server 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a WWW site. More specifically, the mass memory stores applications including WWW server application program 330, programs 334, and rich media presentation application 336. Generally, rich media presentation application 336 generates and provides rich media presentations to a requesting network device (See FIGURES and related discussion below). WWW server application program 330 includes computer executable instructions which, when executed by WWW origin server 300, generate WWW browser displays, including performing the logic described above. WWW origin server 300 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with external security applications (not shown), to send and receive private information in a secure fashion.

WWW origin server 300 may also comprises input/output interface 324 for communicating with external devices, such as a mouse, keyboard, scanner, or other input devices not shown in FIG. 3. Likewise, WWW origin server 300 may further comprise additional mass storage facilities such as CD-ROM/DVD-ROM drive 326 and hard disk drive 328. Hard disk drive 328 is utilized by WWW origin server 300 to store, among other things, application programs, databases, and program data used by WWW server application program 330. For example, customer databases, product databases, image databases, and relational databases may be stored.

FIG. 4 shows an exemplary network device 400 that may be used to receive packages, according to one embodiment of the invention. Network device 400 may be arranged to transmit and receive data on a wireless network or wired network. For instance, network device 400 may send and receive data from other network devices (not shown) and servers (See FIG. 3 and related discussion) as well as receiving content, such as rich media presentations including media packages, presentation packages, and virtual players, as described below. The data transmissions may take place over the Internet, WAN/LAN 200, or some other communications network.

Network device 400 may include many more components than those shown in FIG. 4. However, the components shown are sufficient to disclose an illustrative embodiment for practicing the present invention. As shown in the figure, mobile device 400 includes central processing unit 412, memory 448, RAM 416, ROM 432, operating system 420, application 430, programs 434, data storage 436, bios 418, power 426, input/output interface 424, network interface unit 410, LED 450, audio 454, display 456, keypad 458, and infrared input/output 460.

Mobile device 400 may connect to WAN/LAN 200, or other communications network, via network interface unit 410. Network interface unit 410 includes the necessary circuitry for connecting the network device 400 to WAN/LAN 200, and is constructed for use with various communication protocols including the TCP/IP protocol. Network interface unit 410 may include a radio layer (not shown) that is arranged to transmit and receive radio frequency communications. Network interface unit 410 connects network device 400 to external devices, via a communications carrier or service provider.

Mass memory 448 generally includes RAM 416, ROM 432, and one or more data storage units 436. The mass memory stores operating system 420 for controlling the operation of mobile device 400. This component may comprise a general purpose server operating system such as a version of UNIX, LINUX™, Microsoft WINDOWS®, and the like. Basic input/output system ("BIOS") 418 is also provided for controlling the low-level operation of network device 400.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data used within network device 400. More specifically, the mass memory stores applications including rich media presentation application 430, and programs 434. Programs 434 may include computer executable instructions which, when executed by network device 400, transmit and receive WWW pages, e-mail, audio, video, and the like. One or more programs 434 may be loaded into memory 448 and run under control of operating system 420. Generally, rich media presentation player application 430 receives rich media presentations from a provider and performs the multimedia content relating to the rich media presentations (See FIGURES and discussion below). Examples of application programs include radio tuner programs, phone programs, communication programs, productivity programs (word processing, spreadsheet, etc.), browser programs, and the like. Network device 400 also includes ROM 432. ROM 432 may be used to store data that should not be lost when network device 400 loses power.

Network device 400 also comprises input/output interface 424 for communicating with external devices, such as a headset, or other input or output devices not shown in FIG. 4. Data storage 436 is utilized by network device 400 to store, among other things, application programs, databases, and program data used by the mobile device broadcast delivery application. For example, user databases, product databases, image databases, and relational databases may be stored. Keypad 458 may be any input device arranged to receive inputs from a user. For example, keypad 458 may be a push button numeric dialing, or a keyboard. Display 456 may be a liquid crystal display, or any other type of display commonly used in network devices. Display 456 may also be a touch screen arranged to receive a users inputs. Infrared input/output 460 may be used to send and receive infrared commands.

Power supply 426 provides power to network device 400. According to one embodiment, a rechargeable battery provides power. The power may be also be provided by an external power source, such as an AC adapter or a powered docking cradle that supplements or recharges the battery.

As shown, network device 400 includes light emitting diode (LED) display 450, and audio interface 454. LED display 450 may be controlled to remain active for specific periods or events. For example, an LED display may stay on while the phone is powered or may light up in response to other events. Audio interface 454 is arranged to receive and provide audio signals. For example, audio interface 454 may be coupled to a speaker (not shown) to provide audio from a telephone call, a tuner, or from some other audio source. Audio interface 454 may also be coupled to an input device, such as a microphone, to receive audio input.

Figure 5:
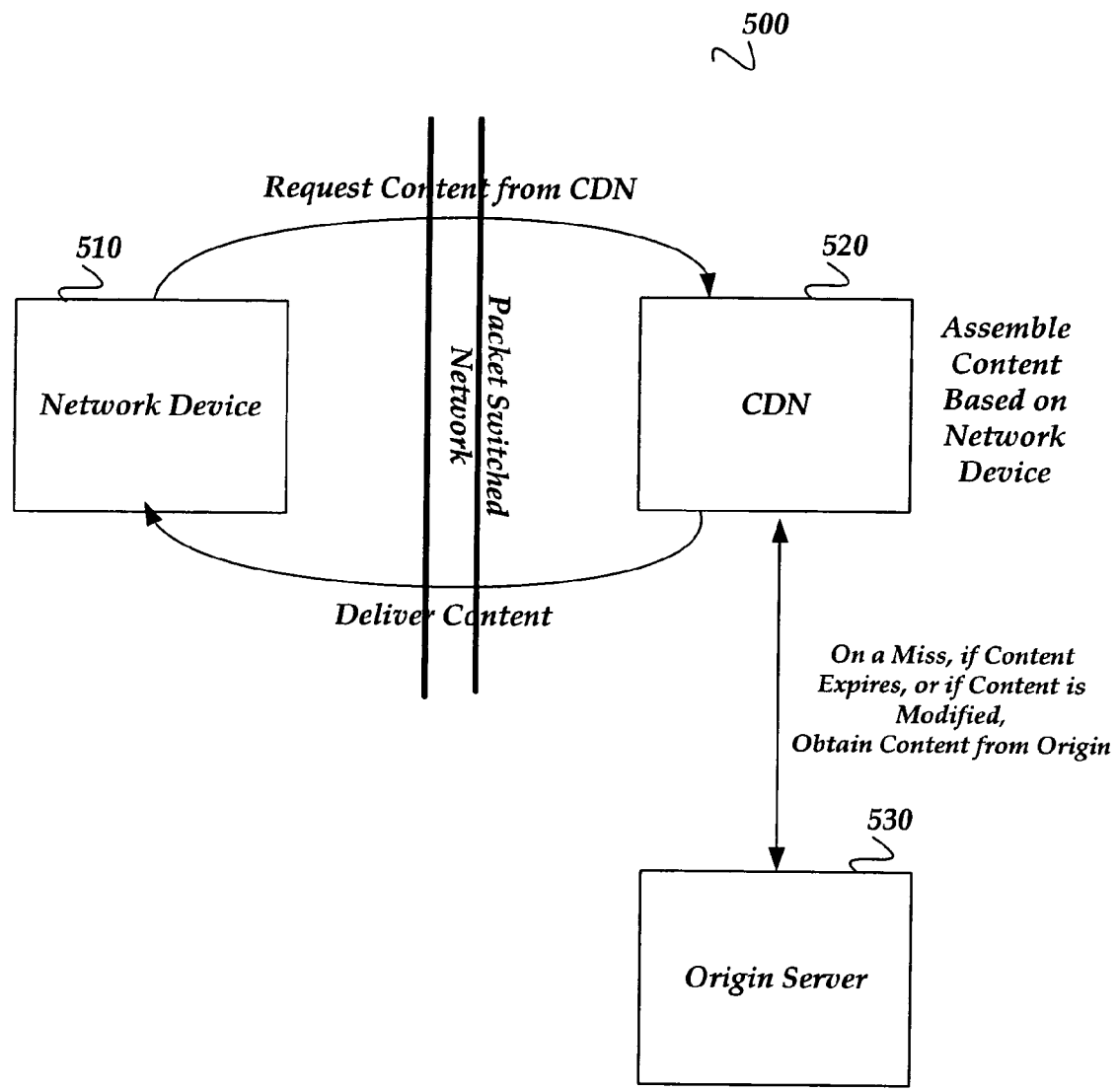
FIG. 5 illustrates a functional block diagram showing an on-demand content delivery system using a CDN.

FIG. 5 illustrates a functional block diagram showing an on-demand content delivery system using a CDN, according to one embodiment of the invention. As shown in the figure, on-demand content delivery system 500 includes network device 510, CDN 520, and origin server 530. Network device 510 and origin server 530 are coupled to CDN 520 through a network, such as a packet switched network.

Network device 510 requests content from a CDN. The content request may be for any type of content available from CDN 520 or origin server 530. According to one embodiment of the invention, the content request is for content associated with virtual player packages. For example, the content may be for a virtual player, presentation packages, or media packages that are specifically encoded for network device 510. CDN 520 receives the content request and attempts to assemble the content based on instructions from origin server 530. When the requested content is available, CDN 520 delivers the requested content to requesting device 510. When the requested content is not available on CDN 520, CDN 520 obtains the requested content from origin server 530. The content may not be available on CDN 520 for many reasons. For example, the requested content may be expired, new content may be available, or the requested content may not be located on CDN 520. As mentioned above, when the content is not available on CDN 520, CDN 520 obtains the content from origin server 530. The content is then maintained by CDN 520 according to the instructions regarding the content obtained from origin server 530. For example, CDN 520 may be instructed to maintain the content for some predetermined period. CDN 520 may be instructed to maintain the content for one minute, ten minutes, one day, one week, and the like. CDN 520 delivers the content to the requesting device after it has obtained the content from origin server 530.

CDN 520 may be any number of CDNs available. For example, the following is a partial list of available CDNs and competing CDN technologies that may be used in accordance with aspects of the invention. The list is not meant to be exhaustive or provide all of the details relating to the CDN. Akamai provides content delivery and streaming media services, along with global traffic management. AppStream's infrastructure monitors the usage of central databases and applications, segments them, and proactively moves the computing resources to application servers closest to the users that need them. AT&T ICDS monitors the origin Web site for changes in content and replicates the changes on mirror sites across their worldwide networks and data facilities, including an expansive cable network. Digital Island provides delivery of all major kinds of content, including streaming media, and features multiple authentication methods to provide secure content delivery. SolidSpeed uses intelligent routing and network optimization to bypass internet bottlenecks. They work to find the most efficient route between your customers and your content. Speedera's CDN pushes content from web origin sites to caching servers at the "edge" of the Internet, much closer to users. XOSoft's CDN sends only the changes of documents combining mirrors and caches to synchronize content worldwide, and deliver fresh content to users quickly. As can be seen, the available CDNs are extensive and the appropriate CDNs may be chosen based on the content being delivered to the requesting device.

Figure 6:
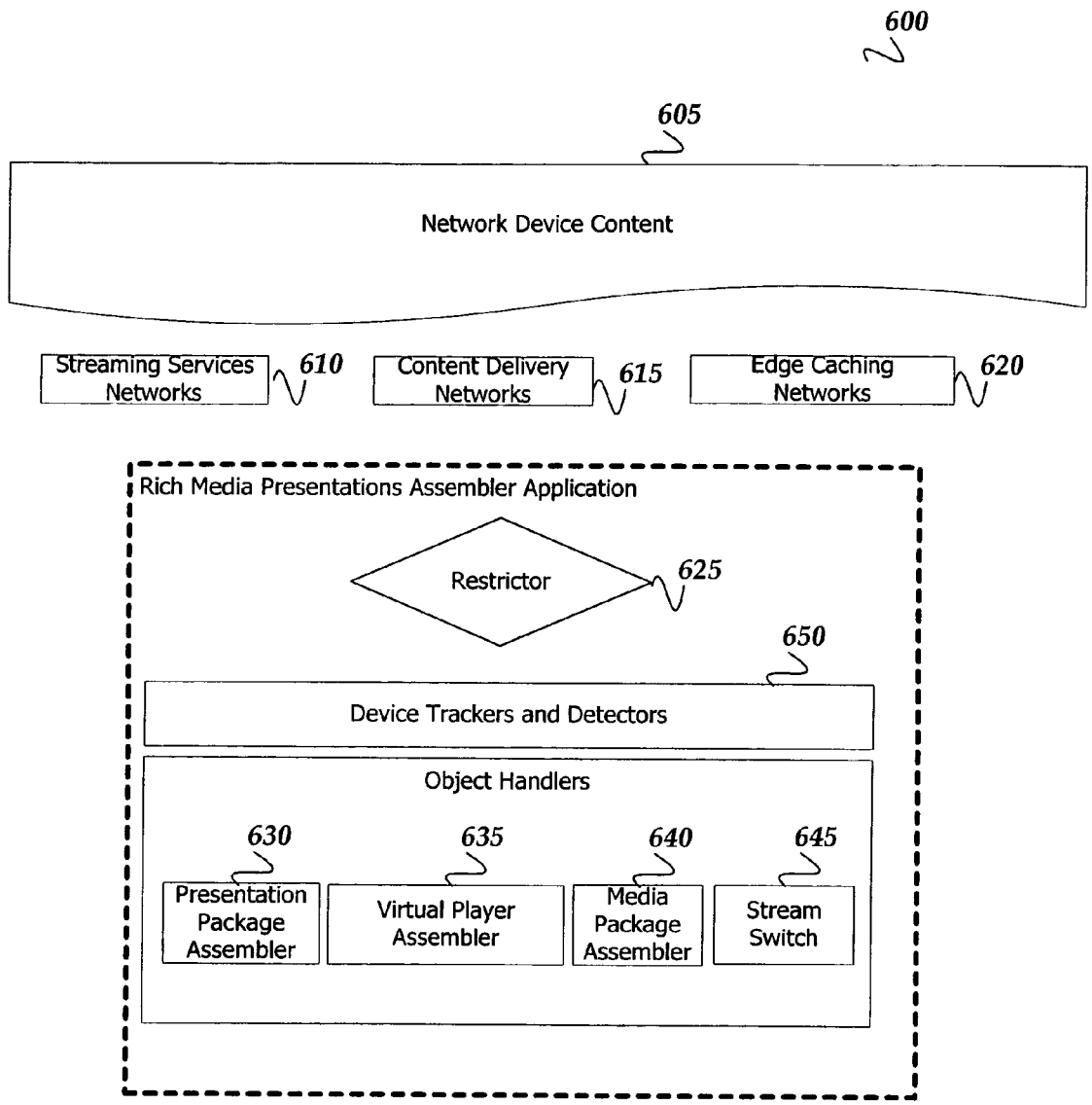
FIG. 6 illustrates a schematic diagram of a rich media presentation system.

FIG. 6 illustrates a schematic diagram of a rich media presentation system in accordance with aspects of the invention. As illustrated in the figure, rich media presentation system 600 includes network device content 605, streaming services networks 610, content delivery networks 615, edge caching networks 620, restrictors 625, presentation package assembler 630, virtual player assembler 635, media package assembler 640, stream switch 645, and device trackers and detectors 650.

The device may receive rich media presentations from many different networks. Network device content 605 may come from streaming services networks 610, content delivery networks 615, edge caching networks 620, as well as other networks (not shown). Restrictor 625 may restrict the device from receiving rich media presentations. According to one embodiment of the invention, restrictor 625 determines when the request for the rich media presentations is coming from a supported site. A supported site is a site on the network that has an affiliation with the provider of the rich media presentations. For example, a site not affiliated with the provider may attempt to incorporate the rich media presentations on their site. When the rich media presentations are requested by the device, restrictor 625 will recognize that the request is coming from an unaffiliated site and deny access. Restrictor 625 may be programmed to do many other tasks. For example, restrictor 625 may be programmed to return different versions of rich media presentations having varying capability based on the site location or some other attribute.

Figure 8:
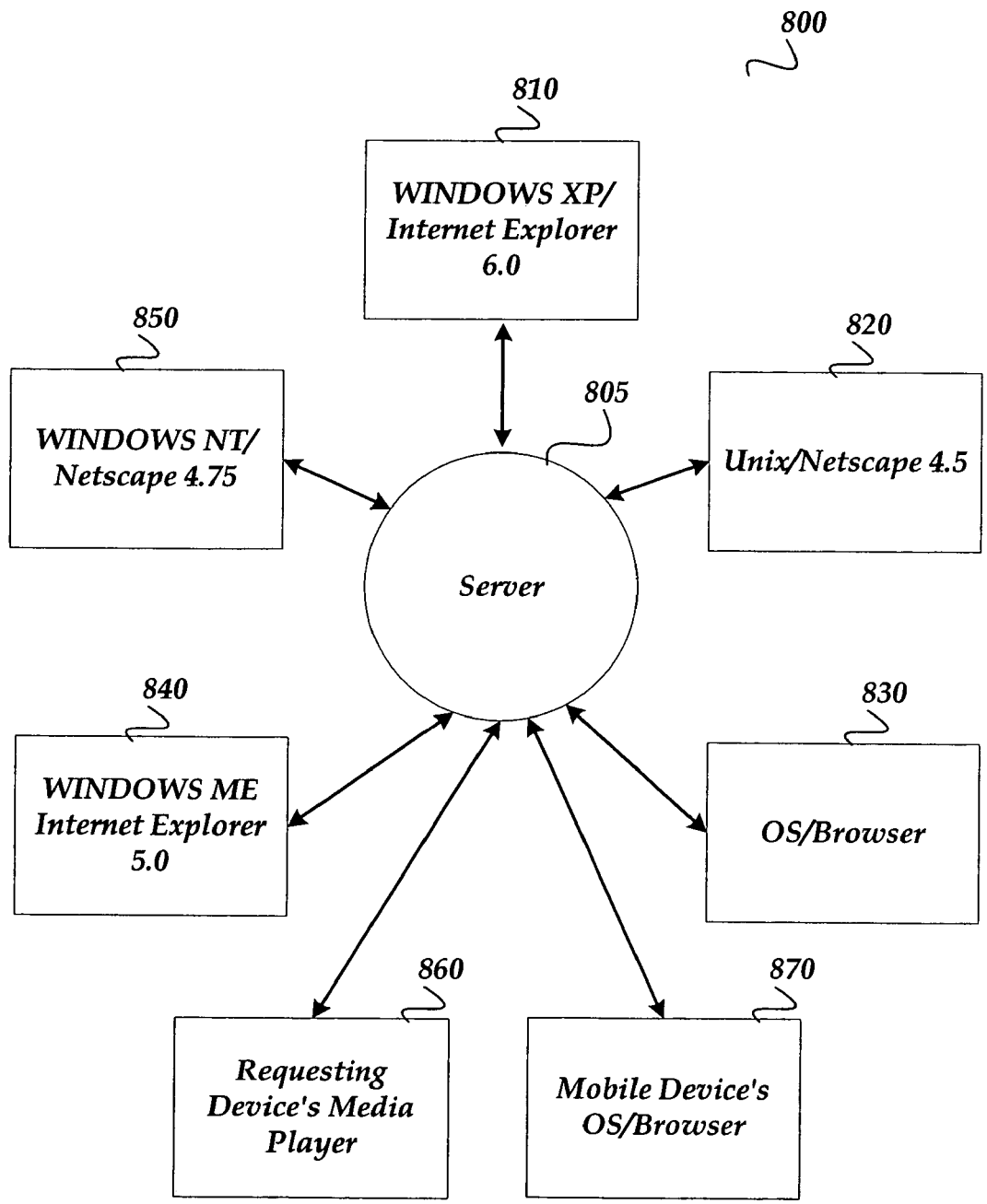
FIG. 8 illustrates an attribute inquiry system containing a set of exemplary basic attributes of network devices.
Figure 10:
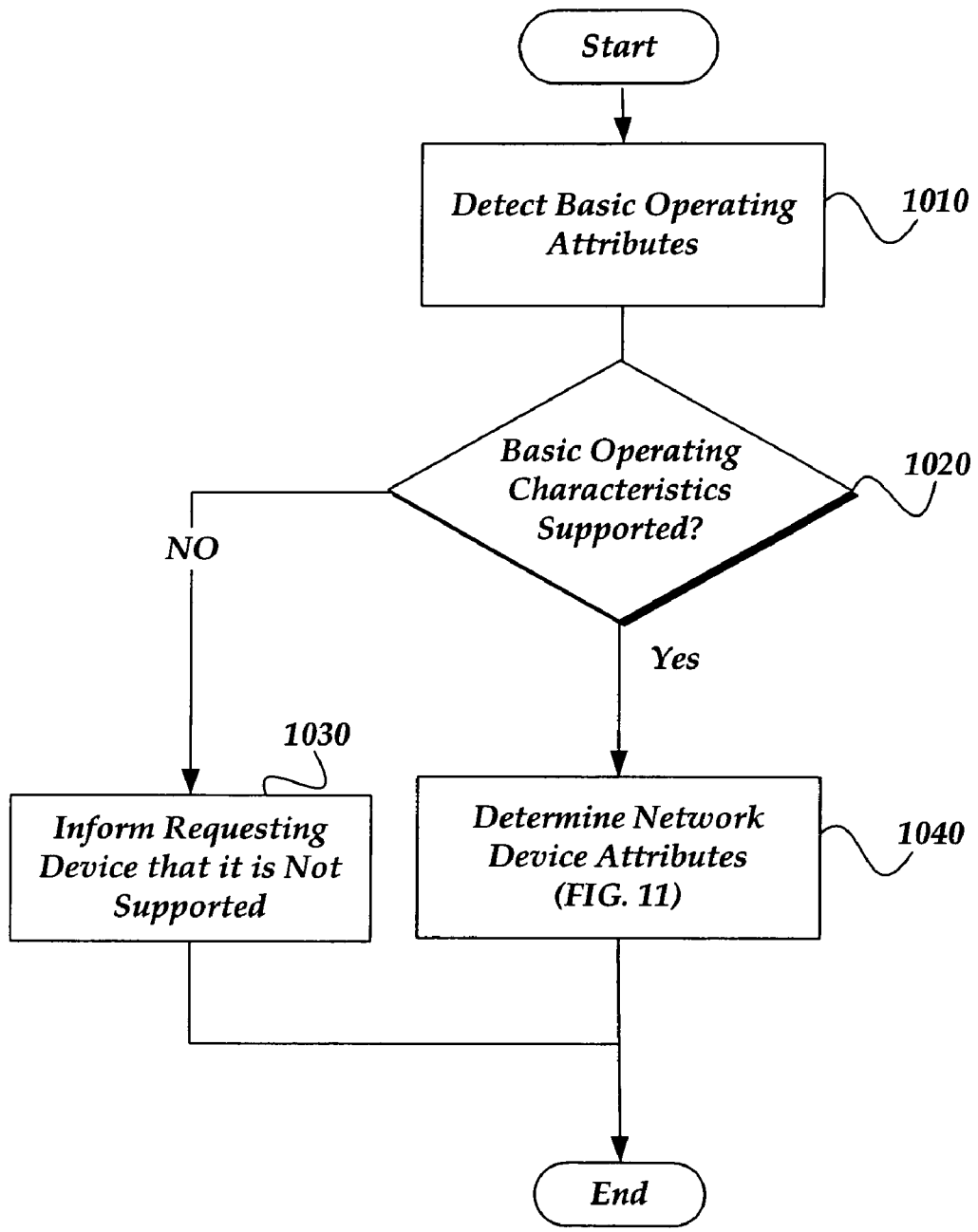
FIG. 10 illustrates a process for determining attributes related to a network device.
Figure 11:
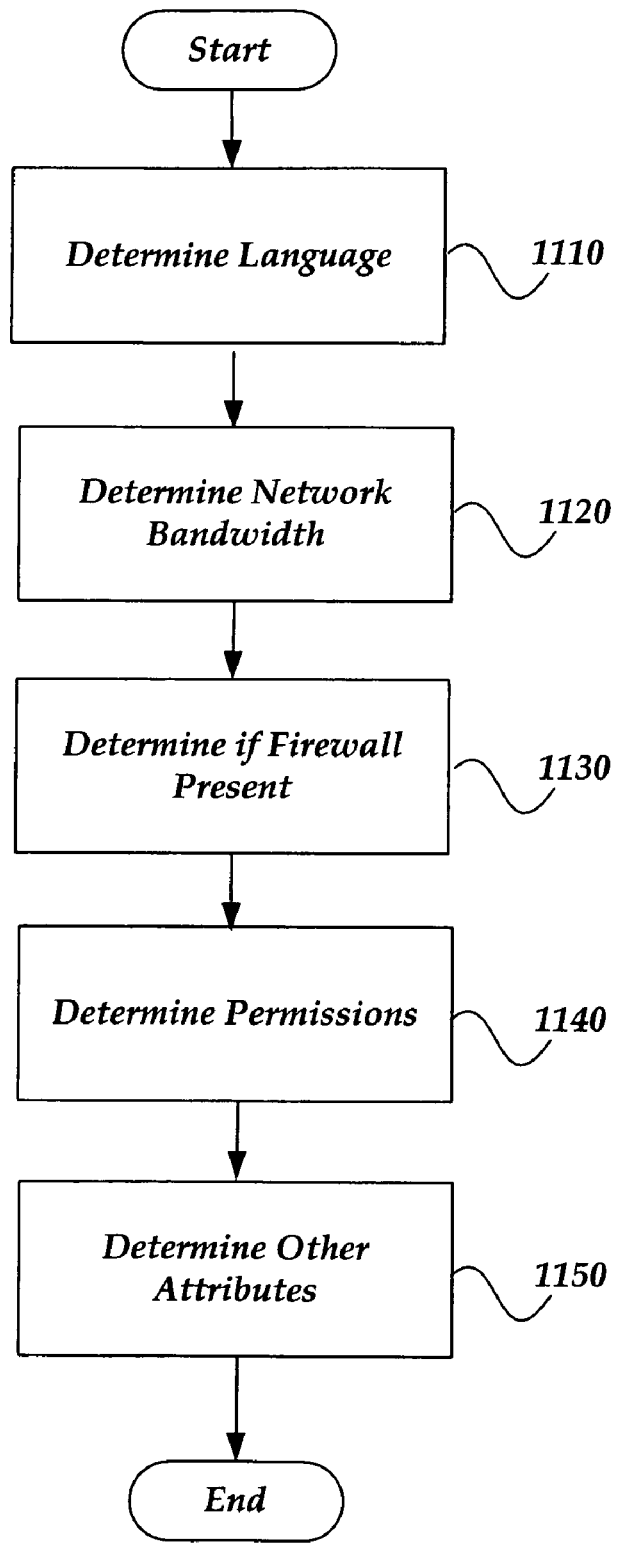
FIG. 11 shows a process for retrieving additional attributes from a device.

When the request for the rich media presentations moves beyond restrictor 625, device trackers and detectors 650 determines the requesting device's attributes (See FIGS. 8, 10, and 11 and related discussion). Generally, device trackers and detectors 650 determine the attributes to send optimized rich media presentations to the requesting device. Based on the attributes of the requesting device, the rich media presentations are assembled. An exemplary illustration of the operation of the rich media presentation system will now be described.

The object handlers including presentation package assembler 630, virtual player assembler 635, and media package assembler 640 may create their respective packages in advance of a request by a device or create the packages "just in time" (JIT) to meet the requesting device's configuration. For example, virtual player assembler may encode the virtual player package to be optimized for a WINDOWS 98 operating system using Windows Media Player V7.0 or some other device. According to one embodiment of the invention, the encoded virtual player packages are stored in a database and sent to a CDN and cached for a predetermined time. According to another embodiment, the virtual player packages are encoded when requested by a device.

Virtual player assembler 635 creates a virtual player for the requesting device. Different media players may be used by the virtual player. For example, Microsoft's Media Player and Real Networks' Media Player may be used by the virtual player to play the media packages. The virtual player assembler uses attributes determined by device tracker and detectors 650 to create optimized virtual player code for the requesting device. Instead of an e-retailer to having to include code on a web page for every possible media player, the e-retailer only includes a single line of code. The line of code is simply a request for an include file from a server. This include file contains the required JavaScript functions for a given browser and for the implementation of the videos relating to the presentation package and media package on a given web page. According to one embodiment of the invention, e-retailers place this line of code at the top of the body section of each Web page where a video will be available to the requesting device.

When loading a Web page containing the code, a network device requests the include file from servers relating to the provider. Before the virtual player code is delivered to the network device to be stored in network device content 605, device trackers and detectors 650 performs operating system and browser detection. This detection allows the virtual player assembler 635 to return the appropriate include file, the contents of which are browser specific. If the provider does not support a device's configuration, the provider will send all required packages containing stub functions. The returned include file including the browser and system -specific code is approximately 18 KB in size and will remain in the requesting device's browser cache. Thereafter, each time a requesting device requests the include file, the provider instructs the browser to use the copy of the file stored in the cache. A requesting device downloads this file again only if there has been a change to the include file on the server-side, or when the include file can not be found in the cache. Exemplary syntax for this line of code is as follows:

```
<script src="http://ondemand.vendaria.com/envision/idletize.idlet"
language="JavaScript1.2" type="text/javascript"></script>
```

Presentation package assembler 630 sets the presentation attributes relating to the virtual player and media package. A presentation package line of code is included in the e-retailers Web page requesting a presentation package include file from a server. According to one embodiment of the invention, the presentation package include file contains creative specific presentation-package information, a combination of a "Watch Video" button, a customized media player skin, and a presentation type (embedded or popup). Multiple presentation packages may be used by the e-retailer. For example, a different package for each video on your site may be used. The presentation package include file is approximately 4 KB in size and remains in the requesting device's browser cache. Thereafter, each time the presentation package include file is requested by the device, the provider instructs the browser on the requesting device to use the copy of the file stored in the cache. A requesting device downloads this file again when there has been a change to the presentation package include file or when the file can not be found in the cache. Because e-retailers will likely use the same presentation package on multiple product pages, the speed and performance of the media presentation will improve markedly once a device has downloaded the presentation package include file. An exemplary syntax for this line of code is as follows:

```
<script src="http://ondemand.vendaria.com/envision/
{IdletPseudonym}.idlet"
language="JavaScript" type="text/javascript"></script>
where: {IdletPseudonym} is a value that uniquely identifies an
e-retailer's presentation package.
```

The code in the presentation package include file allows many presentation attributes relating to the rich media presentation to be set. For example, the rich media presentation's precise play location on a Web page may be set. A skin for the virtual player may be set. Images for buttons may be set. For example, an image separate from the default image for the "watch video" button may be set. The length of the rich media presentation may be displayed at a defined location. The presentation package and/or virtual player window may be automatically closed once a rich media presentation has stopped playing. In addition, text links may be used instead of buttons with images to trigger the start of a rich media presentation. Other presentation attributes may also be set. The attributes may be set within a Web page, or may be set using an API. The following is an exemplary syntax for defining some of the presentation attributes associated with the rich media presentation on a Web page.

```
<script language="JavaScript" type="text/javascript">
var vnd_idletOverride_{IdletPseudonym} = new
vnd_objIdletOverride({LocationTop}, {LocationLeft}, "{Locator}",
"{BURL}", {ShowLen}, {CenterScreen}, {AutoHide});
</script>
where:
{IdletPseudonym} is a value that uniquely identifies an e-retailer's
presentation package.
{LocationTop} is the top coordinate of the player skin or video, if no
skin is selected.
{LocationLeft} is the left coordinate of the media skin or video, if no
skin is selected
{Locator} is the name of an image object located on the page used for
positioning the top and left coordinates of the media player skin or video,
if no skin is selected.
{BURL} is the complete URL of the image you will use to start a video
in lieu of the "watch video" button.
{ShowLen} is the indicator that determines if text describing the length
of the video will appear next to the Watch Video button.
{LocCenterScreen} is the indicator that determines if the skin and media
player will be centered in the middle of the screen. If the value is set to
false, then the skin or media player will be located based on the default
attributes of the presentation package or the override values found in
{LocationTop} and {LocationLeft} or {Locator}.
{AutoHide} is an optional indicator that determines if the media player
layers disappear upon completion of a video. If the value is true, the skin
and/or media player disappear immediately upon completion of the
video; if false, the skin and/or media player will remain displayed on the
page along with the final frame of the video.
```

The video may also be set to automatically set to start playing. Auto-play functionality enables a video to start playing immediately after a Web page has been loaded in a requesting device's browser. For example, this feature might be used to play a video welcoming an on-line consumer to a site or to provide instructions to consumers. According to one embodiment, e-retailers include the autoLoad function in the onload event in the body tag as follows: <body onLoad="vnd—autoLoad()">

Media package assembler 640 assembles the combination of multimedia specific code and returns a media package include file to the requesting device. A third line of code is included within the e-retailers Web pages where the e-retailer would like a watch video button to appear on a product page.

A server downloads the approximately 1 KB media package include file in a requesting device's browser cache each time the device accesses a Web page where a rich media presentation exists. An exemplary syntax for this line of code is as follows:

```
<script src= "http://ondemand.vendaria.com/envision/
{AdletPseudonym}.adlet?idlet ={IdletPseudonym}"
language="JavaScript" type="text/javascript"></script>
where:
{AdletPseudonym} is a value that identifies a unique combination of
a video in a video library and an e-retailer offering that video to
on-line consumers.
{IdletPseudonym} is a value that uniquely identifies an e-retailer's
presentation package.
Stream switch 645 may be selected to provide streaming content to the
requesting device.
```

Figure 7:
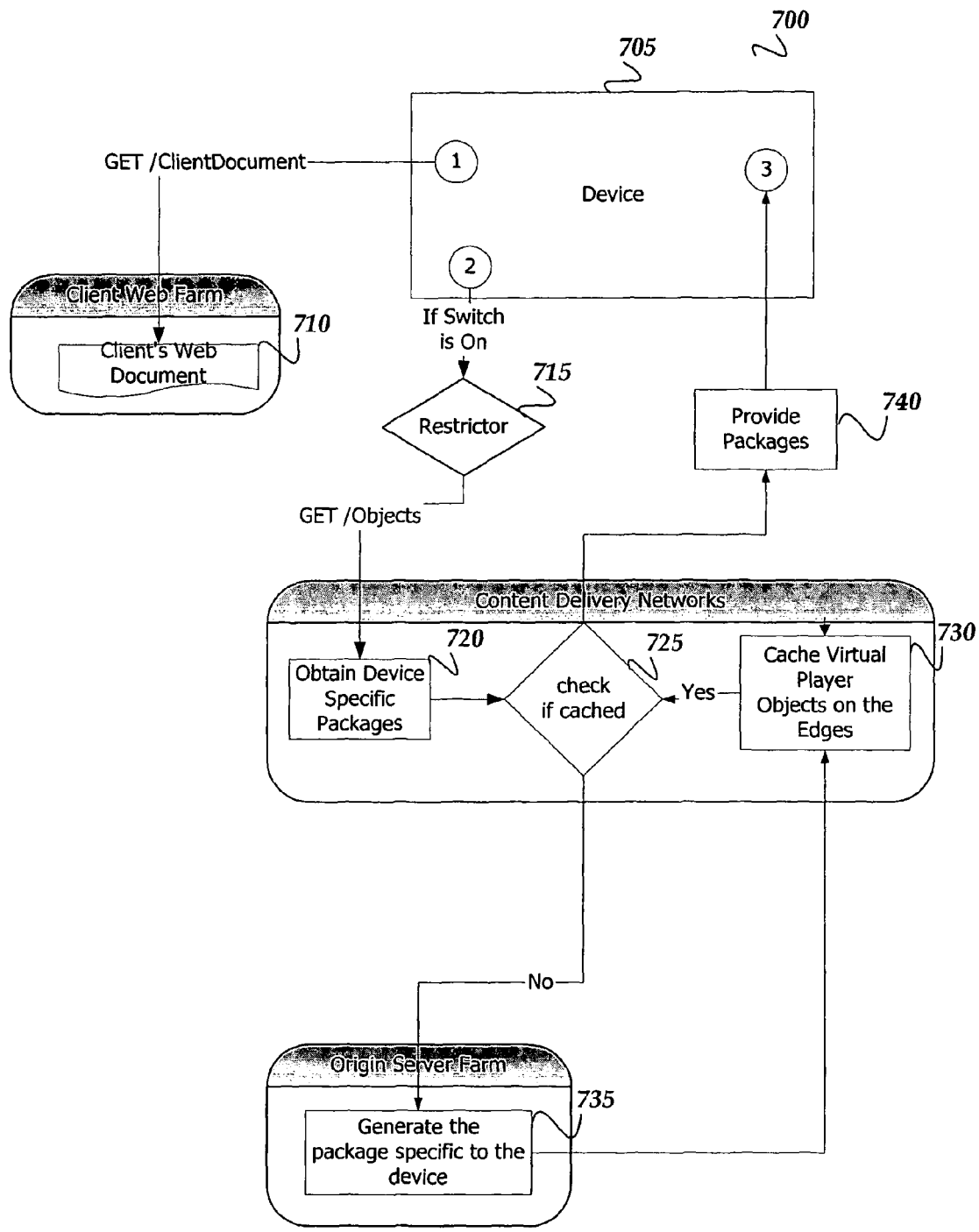
FIG. 7 shows an overview of the rich media presentation system.

FIG. 7 shows an overview of the rich media presentation system, in accordance with aspects of the invention. As shown in the figure, rich media presentation system 700 includes device 705, restrictor 715, web document 710, device specific package requester block 720, cache checking block 725, caching block 730, generate package block 735, and provide packages block 740.

The operation of rich media presentation system 700 will now be described. Device 705 requests client's web document 710 that initiates a request for rich media presentations from the provider. Upon accessing web document 710, device 705 requests optimized packages from the provider. The request goes through restrictor block 715 that may restrict access to the provider upon predefined conditions. For example, if the client is not affiliated with the provider the request for the packages may be denied. When the request is not denied package request block 720 requests device specific packages from the provider. Cache checking block 725 determines whether the packages are cached. If so, the packages are provided to device 705 from the cached location by package provider block 740, such as a content delivery network. When the packages are not cached the provider generates the packages specific to the device and caches them at which point, package provider block 740 provides the packages to device 705.

FIG. 8 illustrates an attribute inquiry system containing a set of exemplary basic attributes of network devices, according to one embodiment of the invention. Generally, attribute inquiry system 800 determines the requesting device's basic configuration including the operating system, browser, and media player used by the requesting device.

Server 805 communicates with the requesting device and receives basic configuration information in return. The configuration information is used to help optimize the requesting device's media experience. According to one embodiment of the invention, javascript code is executed on the requesting device that sends the basic attribute information to server 805.

For example, server 805 receives the operating system (OS) and browser used by the network device (block 830). For example, the requesting device of block 810 has a configuration using the WINDOWS XP operating system and using the Internet Explorer 6.0 browser. The requesting device of block 820 uses the UNIX operating system and uses Netscape 4.5 as the browser. The requesting device of block 840 uses the WINDOWS ME operating system and uses Internet Explorer 5.0 as the browser. The requesting device of block 850 uses the WINDOWS NT operating system and Netscape 4.75 as the browser. The requesting device of block 820 uses the UNIX operating system and Netscape 4.5 as the browser. The requesting device of block 870 is a mobile device. According to this embodiment, server 805 receives the mobile device's OS, browser, as well as its media player information. Similarly, server 805 receives the requesting device's media player according to one embodiment of the invention (block 860). The media player may be any media player type. For example, two popular media players include Real Player developed by Real Networks Corp. and Windows Media Player developed by Microsoft Corp. In addition to obtaining the brand of media player, server 805 also obtains the version of the media player. The media player information is used to produce the virtual player packages to be delivered to the requesting device.

Figure 9:
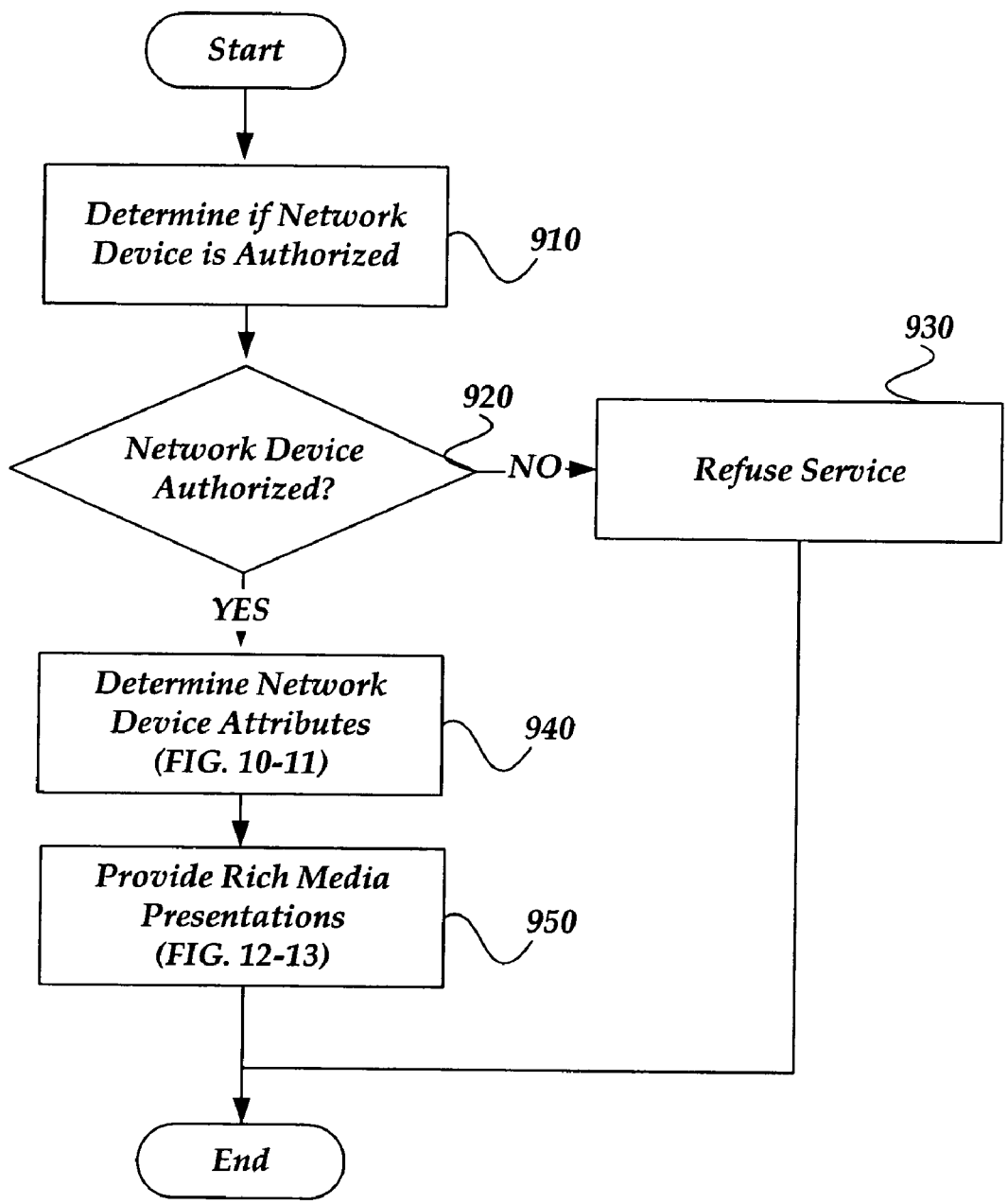
FIG. 9 shows an overview process of providing rich media presentations to an authorized network device.

FIG. 9 shows an overview process of providing rich media presentations to an authorized network device, according to one embodiment of the invention. After a start block, the logical flow moves to block 910 where a determination is made as to whether the network device is authorized to receive the rich media presentations. A device may not be authorized if the device is requesting the rich media presentations from an unaffiliated site. A site may not be affiliated when it does not have a relationship with the provider of the virtual player packages. Stepping to decision block 920, a decision is made as to whether the network device is authorized to receive the rich media presentations. When the network device is not authorized, the process moves to block 930, at which point the network device is refused service. When the service is refused, the process steps to an end block. When the network device is authorized, the process moves to block 940, where the network device's attributes are determined (See FIGS. 10 and 11 and related discussion). Moving to block 950, the rich media presentations needed by the device are provided to the device (See FIGS. 12-13 and related discussion). The process then steps to an end block.

FIG. 10 illustrates a process for determining attributes related to a network device, according to one embodiment of the invention. After a start block, the logic flows to block 1010, where the process detects the basic operating attributes of the requesting device. The basic operating attributes of the device are used to help create rich media presentations that are optimized for the requesting device. According to one embodiment of the invention, the basic attributes include the operating system, browser, and media player used by the requesting device. Other basic attributes may be used depending on the content to deliver to the requesting device. Moving to decision block 1020, a decision is made as to whether the basic operating characteristics are supported by the rich media presentation system. When the operating characteristics of the requesting device are not supported, the logical flow moves to block 1030 at which point the requesting device is informed that it is not supported. When the basic operating characteristics of the requesting device are supported, the process flows to block 1040 where additional attributes are obtained from the requesting device. The additional attributes provide the system with information that allows further optimization of the delivery of the content (See FIG. 11 and related discussion). The logical flow then ends.

FIG. 11 illustrates a process for retrieving additional attributes from the network device, according to one embodiment of the invention. After a start block, the logical flow moves to block 1110 where the language used by the device is determined. The determined language is used to provide the device with content matching their language preference. For example, if the determined language is Spanish, then the rich media presentations will be delivered to the device such that Spanish is supported. Similarly, if the determined language is English, then the rich media presentations are encoded for English. Flowing to block 1120, the network bandwidth is determined. The network bandwidth may be determined many different ways. According to one embodiment of the invention, the bandwidth is determined automatically by performing a download test on the requesting device. The requesting device may download a very small file having a predetermined size for a given period of time. The bandwidth is determined based on the number of files successfully downloaded for the given period of time. As the network conditions may change over time, the download test may be repeated. Moving to block 1130, a determination is made as to whether a firewall is present on the requesting device. Transitioning to block 1140 permissions on the requesting device are determined. For example, permissions may be set that disable the ability to perform certain operations across a network. Moving to block 1150, other attributes may be determined. Another attribute may be a protocol restrictions attribute or the other attributes may include any attributes that help to optimize the rich media presentations for the requesting device.

Figure 12:
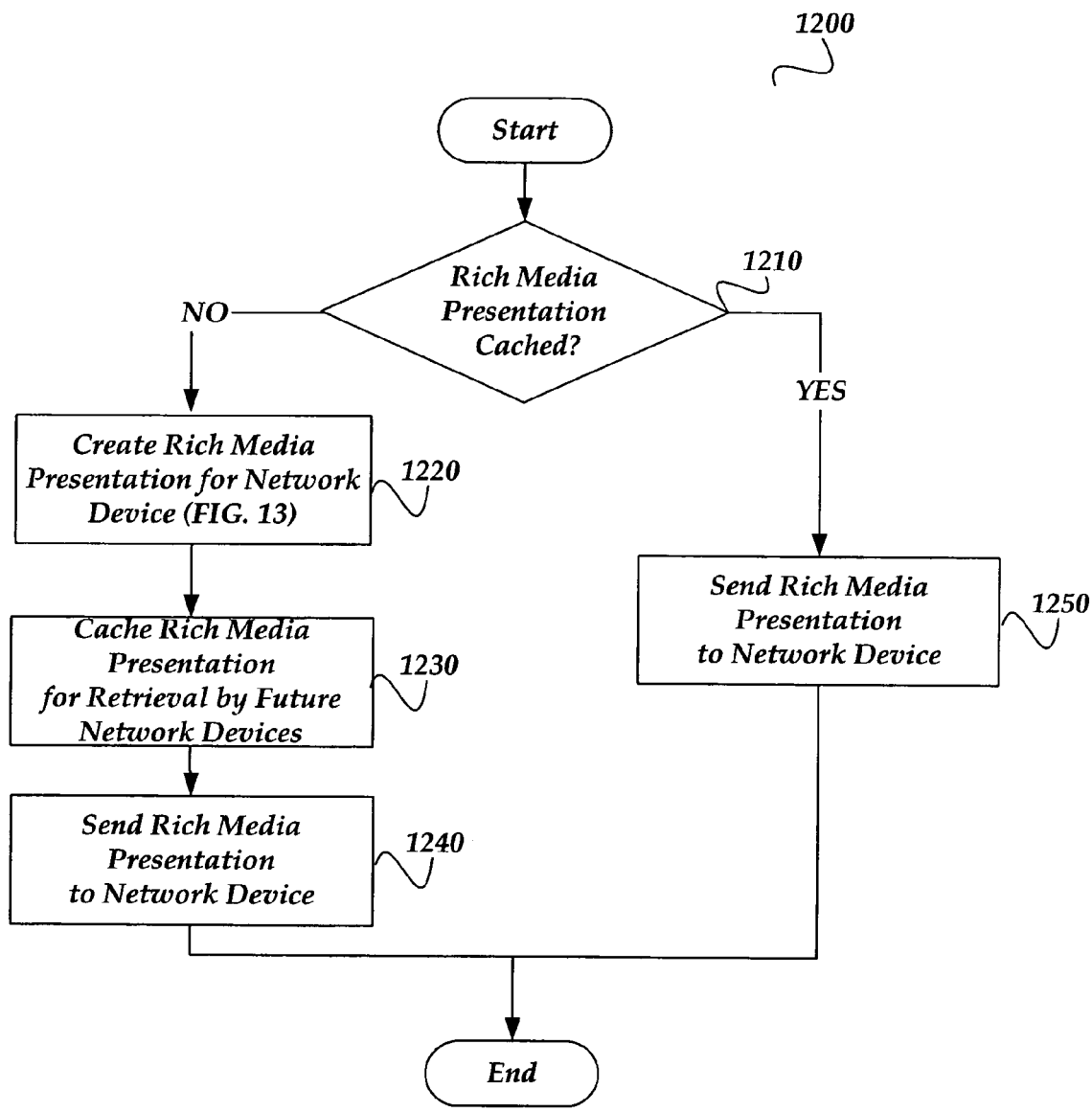
FIG. 12 illustrates a process for selecting a content provider to provide a rich media presentation to a device.

FIG. 12 illustrates a process for selecting a content provider to provide a rich media presentation to a device, according to one embodiment of the invention. After a start block, the process moves to decision block 1210, where the process determines whether the rich media presentations needed for the device are cached. When the rich media presentations are not cached, the process moves to block 1220 where the process creates a rich media presentation for the requesting device. Generally, the rich media presentation may be any or all of the following: a virtual player, a presentation package and a media package. Moving to block 1230 the rich media presentation is cached for later retrieval by a device. Transitioning to block 1240, the rich media presentation is delivered to the device. When the rich media presentation is cached the process steps to block 1250 at which point the cached rich media presentation is sent to the device. The process then steps to an end block and terminates.

Figure 13:
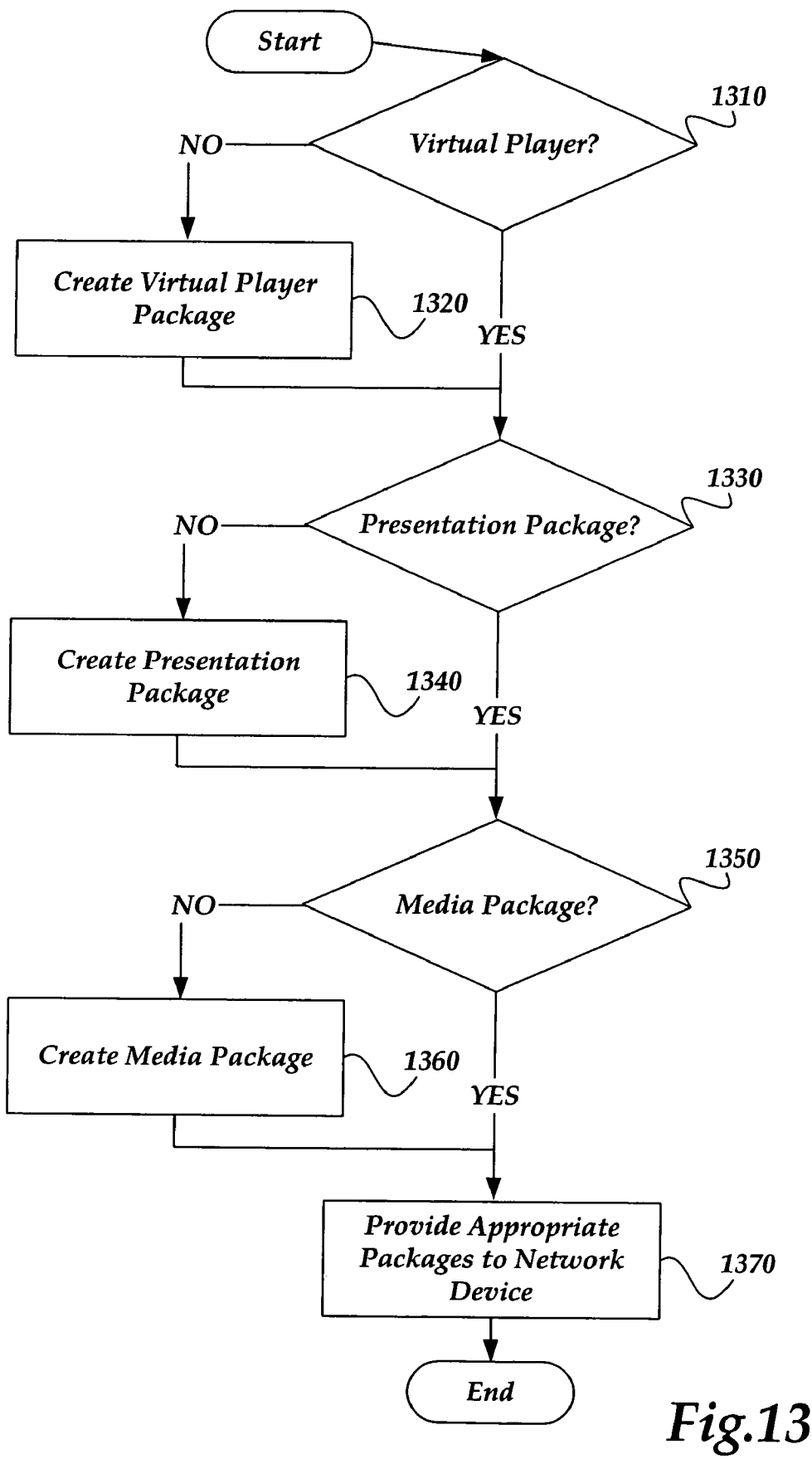
FIG. 13 shows a process for providing rich media presentations to a device.

FIG. 13 shows a process for providing rich media presentations to a device, according to one embodiment of the invention. After a start block, the process moves to decision block 1310, where a determination is made as to whether an up-to-date virtual player is already on the device. A virtual player is provided to the device when a virtual player is not in a cache on the device, or when an updated virtual player is available from the provider. When a virtual player is not on the device, the process moves to block 1320, at which point a virtual player package is created for the device.

The process transitions to decision block 1330, where a determination is made as to whether an up-to-date presentation package is already on the device. A presentation package is provided to the device when a presentation package is not in a cache on the device, or when an updated presentation package is available. When a presentation package is not on the device, the process moves to block 1340, at which point a presentation package is created for the device.

The process steps to decision block 1350, where a determination is made as to whether an up-to-date media package is already on the device. A media package is provided to the device when a media package is not in a cache on the device, or when an updated media package is available. When a media package is not on the device, the process moves to block 1340, at which point a media package is created for the device. According to one embodiment of the invention, a media package is provided to the device at each request as the media package is typically very small in size (approximately 1K).

Moving to block 1370, the created packages are provided to the device.

Figure 14:
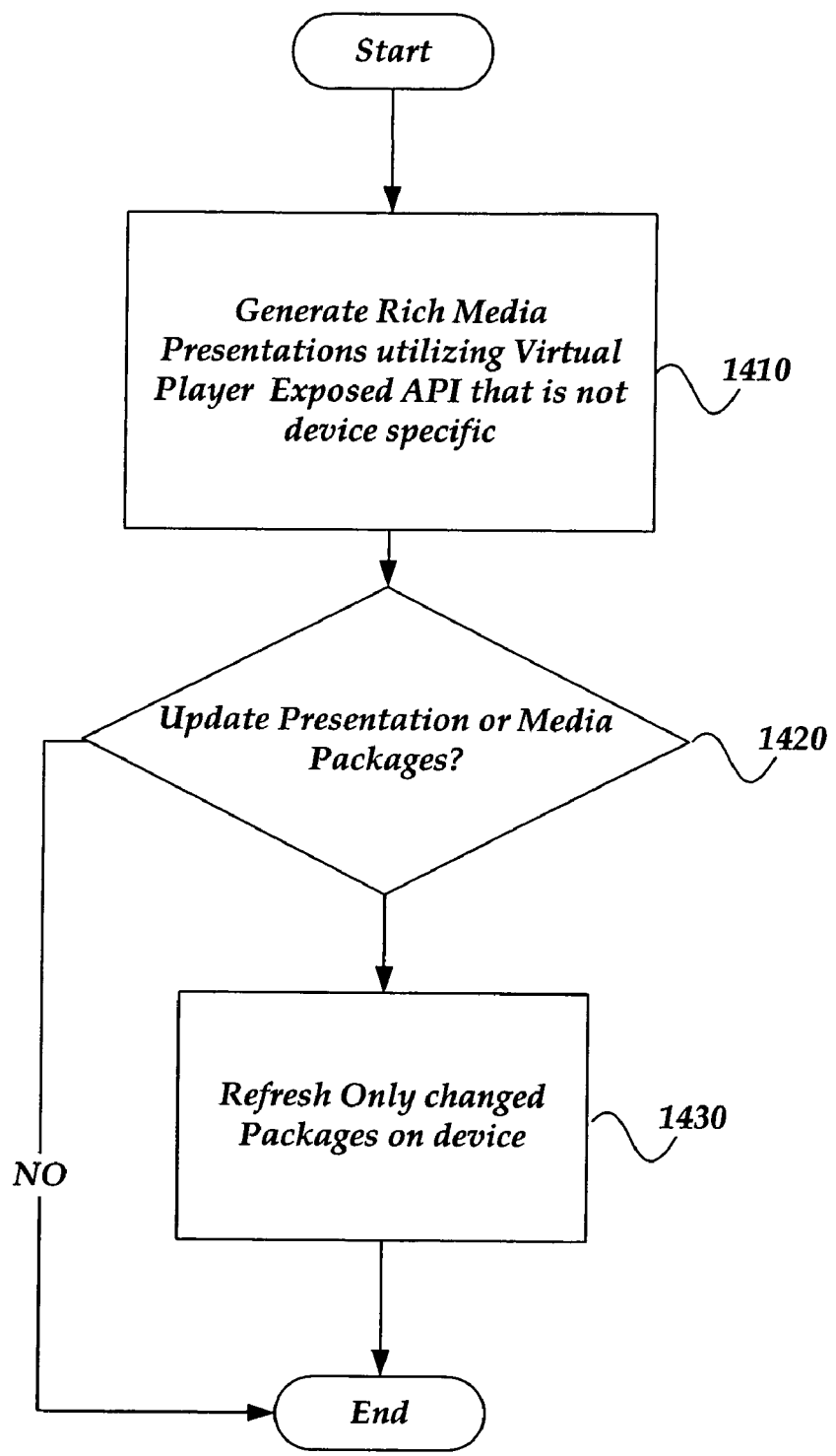
FIG. 14 shows a process for an e-retailer to create and modify rich media presentations; in accordance with aspects of the invention.

FIG. 14 shows a process for an e-retailer to create and modify rich media presentations, in accordance with aspects of the invention. After a start block, the process moves to block 1410, where the e-retailer, or some other party, may generate rich media presentations utilizing a Virtual Player Exposed API that is not device specific. Transitioning to decision block 1420, a decision is made as to whether the presentation or media packages are to be updated. When the packages are not updated, the process steps to an end block. When they are to be updated, the appropriate updates are made and the process moves to block 1430 at which point the device receives the changed packages. The process then steps to an end block.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method, comprising: processing a request for a rich media presentation by:
 detecting one or more operating attributes relating to a requesting device from which the request was received, the one or more operating attributes being associated with an operating system or browser of the requesting device and including one or more operating characteristics;
 determining that the one or more operating characteristics are supported by a rich media presentation system that is configured to send the rich media presentation to the requesting device;
 responsive to determining that the one or more operating characteristics are supported, retrieving one or more additional operational attributes corresponding to the requesting device, the one or more additional operational attributes comprising information that allows tailoring of delivery of the rich media presentation, responsive to the one or more operating characteristics being supported; and
 responsive to retrieving the one or more additional operational attributes, causing the rich media presentation system to send the rich media presentation to the requesting device, the rich media presentation configured according to the one or more operating attributes and including a virtual player configured for the requesting device.

2. The method of claim 1, wherein causing the rich media presentation to be sent to the requesting device comprises causing to be sent to the requesting device:
 a presentation package configured for the requesting device; and
 a media package for the requesting device.

3. The method of claim 1, wherein retrieving one or more additional operational attributes comprises retrieving at least one of a language attribute, a bandwidth attribute, a firewall attribute, or a permissions attribute.

4. The method of claim 3, wherein causing the rich media presentation to be sent to the requesting device comprises:
 determining when the rich media presentation is cached by the requesting device; and when cached:
  determining when there is an update to the rich media presentation available, and when an update to the rich media presentation is available, sending a different rich media presentation to the requesting device, otherwise, causing the rich media presentation cached by the requesting device to be utilized.

5. The method of claim 4, wherein causing the rich media presentation to be sent to the requesting device comprises:
determining when the rich media presentation is cached on a content delivery network; and when the rich media presentation is cached in the content delivery network, causing the rich media presentation to be sent to the requesting device from the content delivery network, otherwise, causing the rich media presentation to be sent from an origin server.

6. The method of claim 1, further comprising restricting sending of the rich media presentation to the requesting device, responsive to determining that the request is associated with an unaffiliated site.

7. The method of claim 1, further comprising responsive to determining that the one or more operating characteristics are not supported by the rich media presentation system, informing the requesting device that the one or more operating characteristics are not supported.

8. A computer-readable storage medium having instructions stored thereon, the instructions comprising:
instructions to receive a request for a rich media presentation from a requesting device when the requesting device accesses a web page, the request being made before a request is made to play the rich media presentation on the requesting device;
instructions to determine when the requesting device is authorized to receive the rich media presentation; and
instructions to, when the requesting device is determined to be authorized to receive the rich media presentation:
detect one or more operating attributes relating to the requesting device, the one or more operating attributes being associated with an operating system or browser of the requesting device and including one or more operating characteristics;
determine whether the one or more operating characteristics are supported by a rich media presentation system that is configured to send the rich media presentation to the requesting device;
responsive to a determination that the one or more operating characteristics are supported, retrieve one or more additional operational attributes corresponding to the requesting device, the one or more additional operational attributes comprising information that allows tailoring of delivery of the rich media presentation, and
responsive to a retrieval of the one or more additional operational attributes, cause the rich media presentation system to send the rich media presentation having a configuration based on the one or more operating attributes to the requesting device, the rich media presentation including a virtual player configured according to the one or more operating attributes; and
responsive to a determination that the one or more operating characteristics are not supported by the rich media presentation system, inform the requesting device that the one or more operating characteristics are not supported.

9. The computer-readable storage medium of claim 8, wherein the rich media presentation further comprises a presentation package configured according to the one or more operating attributes, and a media package for the requesting device.

10. The computer-readable storage medium of claim 8, wherein the one or more additional operational attributes comprise at least one of a language attribute, a bandwidth attribute, a firewall attribute, or a permissions attribute.

11. The computer-readable storage medium of claim 10, wherein the instructions to cause the rich media presentation to be sent to the requesting device comprise instructions to determine when an existing rich media presentation cached by the requesting device is up-to-date; and when the rich media presentation cached by the requesting device is determined to be up-to-date, instructions to cause the rich media presentation cached by the requesting device to be used, otherwise, instructions to cause a different rich media presentation to be sent to the requesting device.

12. The computer-readable storage medium of claim 11, wherein the instructions to cause the different rich media presentation to be sent to the requesting device comprise instructions to determine when the different rich media presentation is cached on a content delivery network, and when the different rich media presentation is cached on the content delivery network, instructions to cause the different rich media presentation to be sent to the requesting device from the content delivery network, otherwise, instructions to cause the different rich media presentation to be sent from an origin server.

13. A system, comprising:
a processor configured to implement a rich media presentation application to perform actions to:
responsive to a requesting device being authorized to receive a rich media presentation over a network:
detect one or more operating attributes relating to the requesting device, the one or more operating attributes being associated with an operating system or browser of the requesting device and including one or more operating characteristics;
determine whether the one or more operating characteristics are supported by the rich media presentation;
responsive to a determination that the one or more operating characteristics are supported by the rich media presentation application,
retrieve one or more additional operational attributes corresponding to the requesting device, the one or more additional operational attributes comprising information that allows tailoring of delivery of the rich media presentation, responsive to the one or more operating characteristics being supported; and
cause the rich media presentation application to send the rich media presentation to the requesting device, the rich media presentation being configured according to the one or more operating attributes and including a virtual player configured according to the one or more operating attributes; and
responsive to a determination that the one or more operating characteristics are not supported by the rich media presentation application, inform the requesting device that the one or more operating characteristics are not supported.

14. The system of claim 13, wherein the rich media presentation comprises:
a presentation package configured according to the one or more operating attributes; and
a media package for the requesting device.

15. The system of claim 13, wherein the one or more additional operational attributes comprise at least one of a language attribute, a bandwidth attribute, a firewall attribute, or a permissions attribute.

16. The system of claim 15, wherein the rich media presentation application is configured to perform actions to:
determine when a rich media presentation cached by the requesting device is up-to-date; and when it is determined that the rich media presentation cached by the requesting device is up-to-date, cause the rich media presentation to be used, otherwise, cause a different rich media presentation be sent to the requesting device.

17. The system of claim 16, wherein the rich media presentation application is configured to perform actions to:
determine when the different rich media presentation is cached on a content delivery network, and when the different rich media presentation is cached on a content delivery network, cause the different rich media presentation to be sent to the requesting device from the content delivery network, otherwise, cause the different rich media presentation to be sent from an origin server.

* * * * *